US009760179B2

(12) United States Patent
Petschnigg et al.

(10) Patent No.: US 9,760,179 B2
(45) Date of Patent: *Sep. 12, 2017

(54) VIRTUAL PAGE TURN

(71) Applicant: Microsoft Technology Licensing, LLC, Redmond, WA (US)

(72) Inventors: Georg Petschnigg, Seattle, WA (US); Jonathan Reed Harris, Redmond, WA (US); Joshua J. Hinds, Duvall, WA (US); Sabrina Boler, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 417 days.

This patent is subject to a terminal disclaimer.

(21) Appl. No.: 13/931,562

(22) Filed: Jun. 28, 2013

(65) Prior Publication Data
US 2013/0298069 A1   Nov. 7, 2013

Related U.S. Application Data

(63) Continuation of application No. 12/350,049, filed on Jan. 7, 2009, now Pat. No. 8,499,251.

(51) Int. Cl.
*G06F 3/048* (2013.01)
*G06F 3/01* (2006.01)
*G06F 3/0483* (2013.01)
*G06F 3/0488* (2013.01)
*G06T 13/80* (2011.01)

(52) U.S. Cl.
CPC ............ *G06F 3/017* (2013.01); *G06F 3/0483* (2013.01); *G06F 3/04883* (2013.01); *G06T 13/80* (2013.01)

(58) Field of Classification Search
CPC .... G06F 3/0483; G06F 3/017; G06F 3/04883; G06T 13/80
USPC ......................... 715/773, 776, 790
See application file for complete search history.

(56) References Cited

U.S. PATENT DOCUMENTS

| 5,462,725 | A  | 10/1995 | Kiefer et al. |
| 5,463,725 | A  | 10/1995 | Henckel et al. |
| 6,072,476 | A  | 6/2000  | Harada et al. |
| 6,650,343 | B1 | 11/2003 | Fujita et al. |
| 7,071,915 | B2 | 7/2006  | Liang et al. |
| 7,342,569 | B2 | 3/2008  | Liang et al. |
| 7,640,513 | B2 | 12/2009 | Card et al. |
| 8,499,251 | B2 | 7/2013  | Petschnigg et al. |

(Continued)

FOREIGN PATENT DOCUMENTS

| CN | 1292112 A | 4/2001 |
| CN | 1643490 A | 7/2005 |

(Continued)

OTHER PUBLICATIONS

European Patent Office, Examination Report of EP09837802.9, dated Sep. 26, 2013, Germany, 5 pages.

(Continued)

*Primary Examiner* — William Bashore
*Assistant Examiner* — Gregory A Distefano

(57) ABSTRACT

One or more pages are displayed on a touch display. A page-flipping gesture directed to a displayed page is recognized. Responsive to such recognition, a virtual page flip is displayed on the touch display. The virtual page flip turns successive pages to a landing page.

20 Claims, 5 Drawing Sheets

(56) References Cited

U.S. PATENT DOCUMENTS

| | | |
|---|---|---|
| 2001/0050658 A1 | 12/2001 | Adams |
| 2002/0081560 A1 | 6/2002 | Ka-Wah et al. |
| 2002/0116421 A1 | 8/2002 | Fox et al. |
| 2004/0039750 A1* | 2/2004 | Anderson ............. G06F 3/0483 |
| 2007/0070470 A1 | 3/2007 | Takami et al. |
| 2008/0040692 A1* | 2/2008 | Sunday ............... G06F 3/04883 715/863 |
| 2008/0060500 A1* | 3/2008 | La ........................... G10G 1/00 84/486 |
| 2008/0168404 A1 | 7/2008 | Ording |
| 2008/0211778 A1 | 9/2008 | Ording et al. |
| 2008/0259057 A1 | 10/2008 | Brons |
| 2011/0242007 A1 | 10/2011 | Gray et al. |
| 2013/0290895 A1 | 10/2013 | Petschnigg et al. |
| 2013/0298069 A1 | 11/2013 | Petschnigg et al. |

FOREIGN PATENT DOCUMENTS

| | | |
|---|---|---|
| CN | 101017484 A | 8/2007 |
| CN | 101256467 A | 9/2008 |
| EP | 0366578 A1 | 5/1990 |
| EP | 1672474 A2 | 6/2006 |
| JP | 08-286882 | 11/1996 |
| JP | 09-091116 | 4/1997 |
| JP | 11-242539 | 9/1999 |
| JP | 2000163193 A | 6/2000 |
| JP | 2000-242390 | 9/2000 |
| JP | 2001-265481 | 9/2001 |
| JP | 2004-348755 | 12/2004 |
| JP | 2005-346583 | 12/2005 |
| JP | 2006-172465 | 6/2006 |
| JP | 2007-310888 | 11/2007 |
| JP | 2008-179037 | 8/2008 |
| KR | 1020070100544 A | 10/2007 |

OTHER PUBLICATIONS

"Page Curl Pro", retrieved at <<http://www.thepowerxchange.com/category_23_1.html>>, Nov. 6, 2008, pp. 1-12.

Izadi, et al., "C-Slate: A Multi-Touch and Object Recognition System for Remote Collaboration using Horizontal Surfaces", retrieved at <<http://research.microsoft.com/users/antcrim/papers/criminisi_tabletop2007.pdf>>, Oct. 2007, pp. 8.

Hollington, Jesse David, "iPhone Gems: OmniFocus, eReader, Urbanspoon, Instapaper, Fring + Cocktails", retrieved at <<http://www.ilounge.com/index.php/articles/comments/iphone-gems-omnifocus-ereader-urbanspoon-instapaper-fring-cocktails/>>, Oct. 30, 2008, pp. 1-18.

Krazit, Tom, "Hands on with Sony's new PRS-700 digital reader", retrieved at << http://news.cnet.com/crave/?search=gestures>>, Nov. 4, 2008, pp. 1-14.

"Explore the features: Tablet PC support", retrieved at <<http://www.microsoft.com/windows/windows-vista/features/tablet-pc.aspx>>, Nov. 6, 2008, pp. 1-3.

Chu, Y. et al., "Realistic Books: A Bizarre Homage to an Obsolete Medium?", Proceedings of the 2004 Joint ACM/IEEE Conference on Digital Libraries, Jun. 2004, 10 pages.

European Patent Office, Extended European Search Report of EP09837802, dated May 4, 2013, Germany, 6 pages.

"International Search Report", dated: Jul. 20, 2010, Application No. PCT/US2009/066615, filed date: Dec. 3, 2009, pp. 11.

Card, Stuart K. et al., "The WebBook and the Web Forager: An Information Workspace for the World-Wide Web", In Proceedings of the SIGCHI conference on Human factors in computing systems, located at: http://www.sigchi.org/chi96/proceedings/papers/Card/skc1txt.html, Apr. 13, 1996, pp. 1-12.

Chu, Yi-Chun et al., "Realistic books: A bizarre homage to an obsolete medium?", In Proceedings of the Joint ACM/IEEE Conference on Digital Libraries, located at: http://ieeexplore.ieee.org/stamp/stamp.jsp?arnumber=1336103, Jun. 7, 2004, pp. 78-86.

U.S. Appl. No. 12/350,049, Amendment and Response filed Dec. 5, 2012, 9 pgs.

U.S. Appl. No. 12/350,049, Amendment and Response filed Jul. 12, 2012, 12 pgs.

U.S. Appl. No. 12/350,049, Notice of Allowance dated Mar. 20, 2013, 9 pgs.

U.S. Appl. No. 12/350,049, Office Action dated Apr. 12, 2012, 13 pgs.

U.S. Appl. No. 12/350,049, Office Action dated Sep. 5, 2012, 9 pgs.

"Non Final Office Action Issued in U.S. Appl. No. 13/931,533", dated Jun. 19, 2015, 13 Pages.

Chinese Notice of Allowance in Application 200980154367.6, dated Oct. 9, 2014, 4 pgs.

U.S. Appl. No. 13/931,533, Amendment and Response filed Sep. 18, 2015, 9 pgs.

U.S. Appl. No. 13/931,533, Office Action dated Nov. 16, 2015, 14 pgs.

Korean Notice of Allowance in Application 10-2011-7015100, dated Sep. 25, 2015, 6 pgs.

Korean Office Action in Application 10-2015-7036959, dated Feb. 18, 2016, 11 pgs.

U.S. Appl. No. 13/931,533, Amendment and Response filed Apr. 18, 2016, 10 pgs.

U.S. Appl. No. 13/931,533, Office Action dated May 6, 2016, 16 pgs.

Hong et al., "Turning pages of 3D Electronic books", published 2006, pp. 1-8.

U.S. Appl. No. 13/931,533, Office Action dated Sep. 26, 2016, 17 pgs.

Korean Notice of Allowance in Application 10-2015-7036959, dated Jul. 21, 2016, 6 pages.

"Office Action Issued in Korean Patent Application No. 10-2016-7029681", dated Dec. 21, 2016, 5 Pages.

U.S. Appl. No. 13/931,533, Notice of Allowance dated Mar. 23, 2017, 5 pgs.

Chinese 1st Office Action in Application 201410815439.X, dated Apr. 6, 2017, 13 pgs.

\* cited by examiner

VIRTUAL PAGE TURN

CROSS-REFERENCE TO RELATED APPLICATIONS

This application is a continuation of U.S. patent application Ser. No. 12/350,049 filed Jan. 7, 2009 (issued on Jul. 30, 2013 as U.S. Pat. No. 8,499,251) and titled "VIRTUAL PAGE TURN", the entire contents of which is hereby incorporated herein by reference for all purposes.

BACKGROUND

A touch display is a display that serves the dual function of visually presenting information and receiving user input. Touch displays may be utilized with a variety of different devices to provide a user with an intuitive input mechanism that can be directly linked to information visually presented by the touch display. A user may use touch input to push soft buttons, turn soft dials, size objects, orientate objects, or perform a variety of different inputs.

SUMMARY

One or more pages are displayed on a touch display. A page-flipping gesture directed to a displayed page is recognized. Responsive to such recognition, a virtual page flip is displayed on the touch display. The virtual page flip turns successive pages to a landing page This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
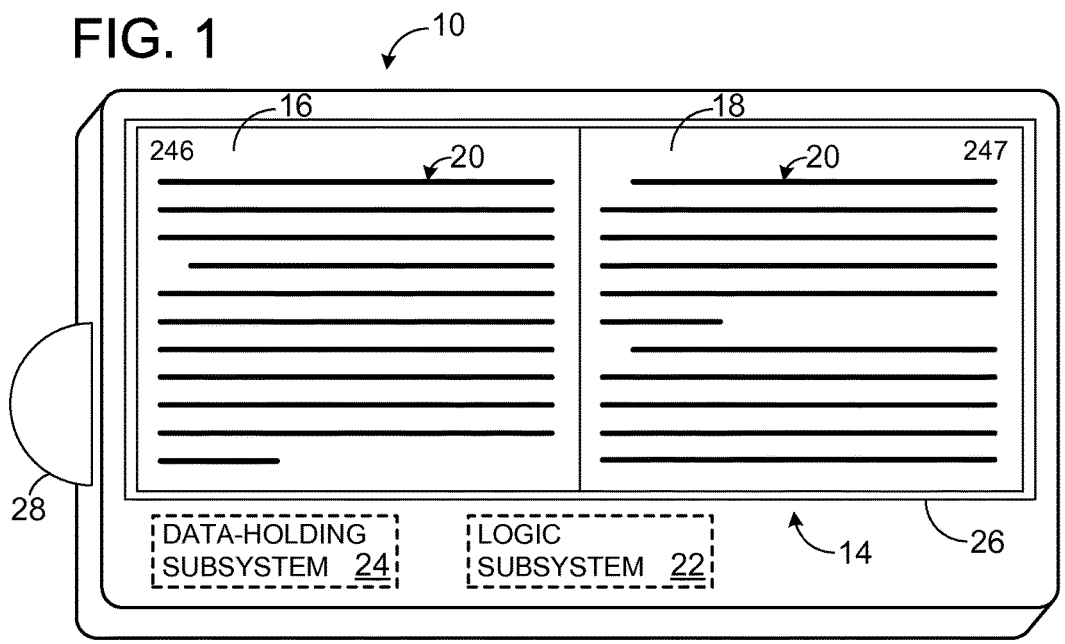
FIG. 1 shows a digital reading device in accordance with an embodiment of the present disclosure.

FIG. 1 somewhat schematically shows a digital reading device 10. In the illustrated embodiment, digital reading device 10 resembles a tablet computing device. However, it is to be understood that the present disclosure is not limited to tablet computing devices. The herein disclosed methods and processes may be implemented on virtually any computing system having a touch display, including computing devices having two or more touch displays, such as foldable digital reading device 12 of FIG. 2.

Digital reading device 10 is shown visually presenting a virtual book 14 that includes opposing pages (i.e., left page 16 and right page 18). The opposing pages include a plurality of words 20 schematically depicted as black lines. However, it is to be understood that the herein described methods and processes may be used to display any visual information, including text, graphics, still images, and/or moving images.

As described in more detail below, a digital reading device in accordance with the present disclosure provides a user with a realistic page turning interface that utilizes some of the more favorable aspects of turning a physical page in a conventional book. At the same time, a digital reading device in accordance with the present disclosure provides a user with advanced page turning functionality unavailable with conventional books. Furthermore, a digital reading device in accordance with the present disclosure is able to provide a user with the many well documented features provided by a computing system, including, but not limited to, advanced find/search capabilities, advanced copy/paste capabilities, substantial data storage capabilities, productivity-increasing applications, and/or network connectivity.

As described in more detail below, digital reading device 10 of FIG. 1 may perform one or more of the herein described page-turning methods and processes. Digital reading device 10 includes a logic subsystem 22, a data-holding subsystem 24, a touch display 26, and optionally other components not shown in FIG. 1. Digital reading device 10 may be a surface computer, tablet computer, mobile communications device, personal data assistant, desktop computer with a touch screen, laptop computer with a touch screen, or virtually any other computing device that utilizes a touch display.

Logic subsystem 22 may include one or more physical devices configured to execute one or more instructions. For example, the logic subsystem may be configured to execute one or more instructions that are part of one or more programs, routines, objects, components, data structures, or other logical constructs. Such instructions may be implemented to perform a task, implement a data type, transform the state of one or more devices, or otherwise arrive at a desired result. The logic subsystem may include one or more processors that are configured to execute software instructions. Additionally or alternatively, the logic subsystem may include one or more hardware or firmware logic machines configured to execute hardware or firmware instructions. The logic subsystem may optionally include individual components that are distributed throughout two or more devices, which may be remotely located in some embodiments.

Data-holding subsystem 24 may include one or more physical devices configured to hold data and/or instructions executable by the logic subsystem to implement the herein described methods and processes. When such methods and processes are implemented, the state of data-holding subsystem 24 may be transformed (e.g., to hold different data). Data-holding subsystem 24 may include removable media and/or built-in devices. Data-holding subsystem 24 may include optical memory devices, semiconductor memory devices, and/or magnetic memory devices, among others. Data-holding subsystem 24 may include devices with one or more of the following characteristics: volatile, nonvolatile, dynamic, static, read/write, read-only, random access, sequential access, location addressable, file addressable, and content addressable. In some embodiments, logic subsystem 22 and data-holding subsystem 24 may be integrated into one or more common devices, such as an application specific integrated circuit or a system on a chip.

FIG. 1 also shows an aspect of the data-holding subsystem in the form of computer-readable removable media 28, which may be used to store and/or transfer data and/or instructions executable to implement the herein described methods and processes.

Touch display 26 may be used to present a visual representation of data held by data-holding subsystem 24. As the herein described methods and processes change the data held by the data-holding subsystem, and thus transform the state of the data-holding subsystem, the state of touch display 26 may likewise be transformed to visually represent changes in the underlying data. Touch display 26 may be operatively coupled to logic subsystem 22 and/or data-holding subsystem 24. Touch display 26 may be combined with logic subsystem 22 and/or data-holding subsystem 24 in a shared enclosure, or touch display 26 may be a peripheral display device.

Figure 2:
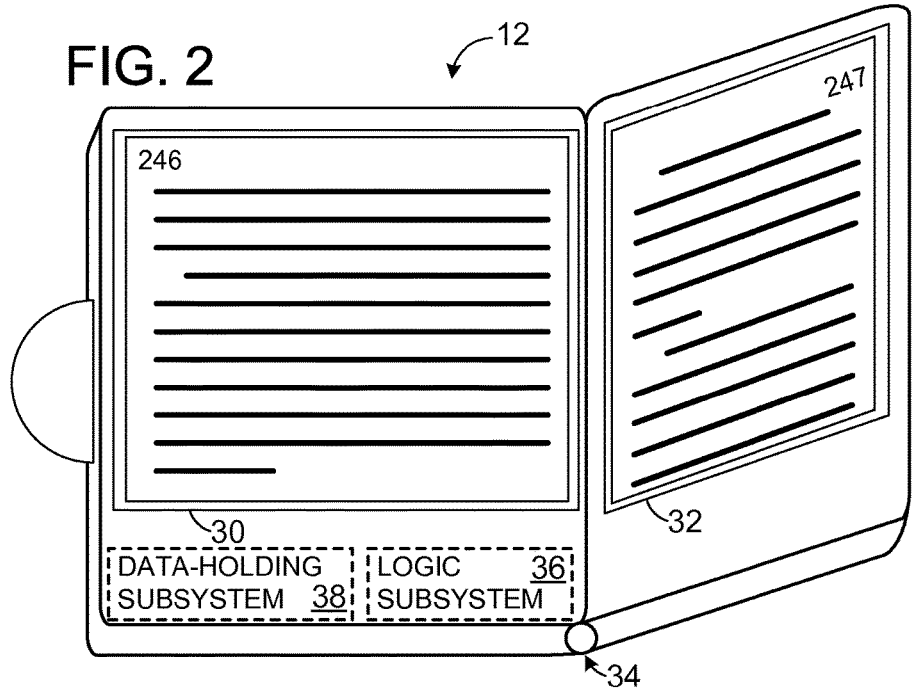
FIG. 2 shows a foldable digital reading device in accordance with an embodiment of the present disclosure.

FIG. 2 shows a nonlimiting example of digital reading device 12 including a first touch display 30 and a second touch display 32. Digital reading device 12 further includes a spine joint 34 foldably connecting the first touch display to the second touch display. A spine joint, or another suitable interconnection mechanism, facilitates the changing of a digital reading device between one or more different configurations (e.g., a flat reading configuration and a folded storage configuration). Digital reading device 12 further includes a logic subsystem 36 and a data-holding subsystem 38, as described above with reference to logic subsystem 22 and data-holding subsystem 24 of FIG. 2.

Digital reading devices that include two or more touch displays may utilize each such display for presenting a different virtual page. In other embodiments, a digital reading device, whether including a single touch display or two or more touch displays, may utilize different regions of a touch display for presenting different pages.

Figure 3:
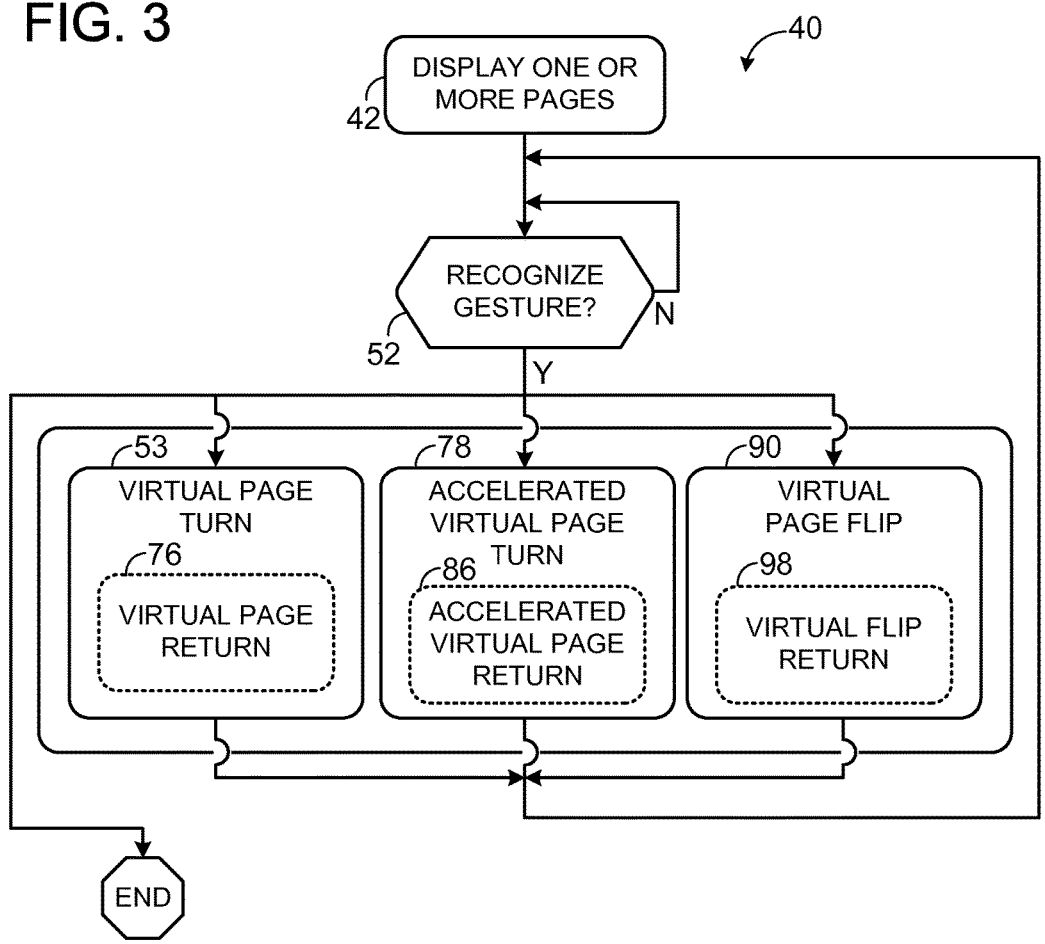
FIG. 3 shows a method of operating a computing device having a touch display in accordance with an embodiment of the present disclosure.
Figure 4:
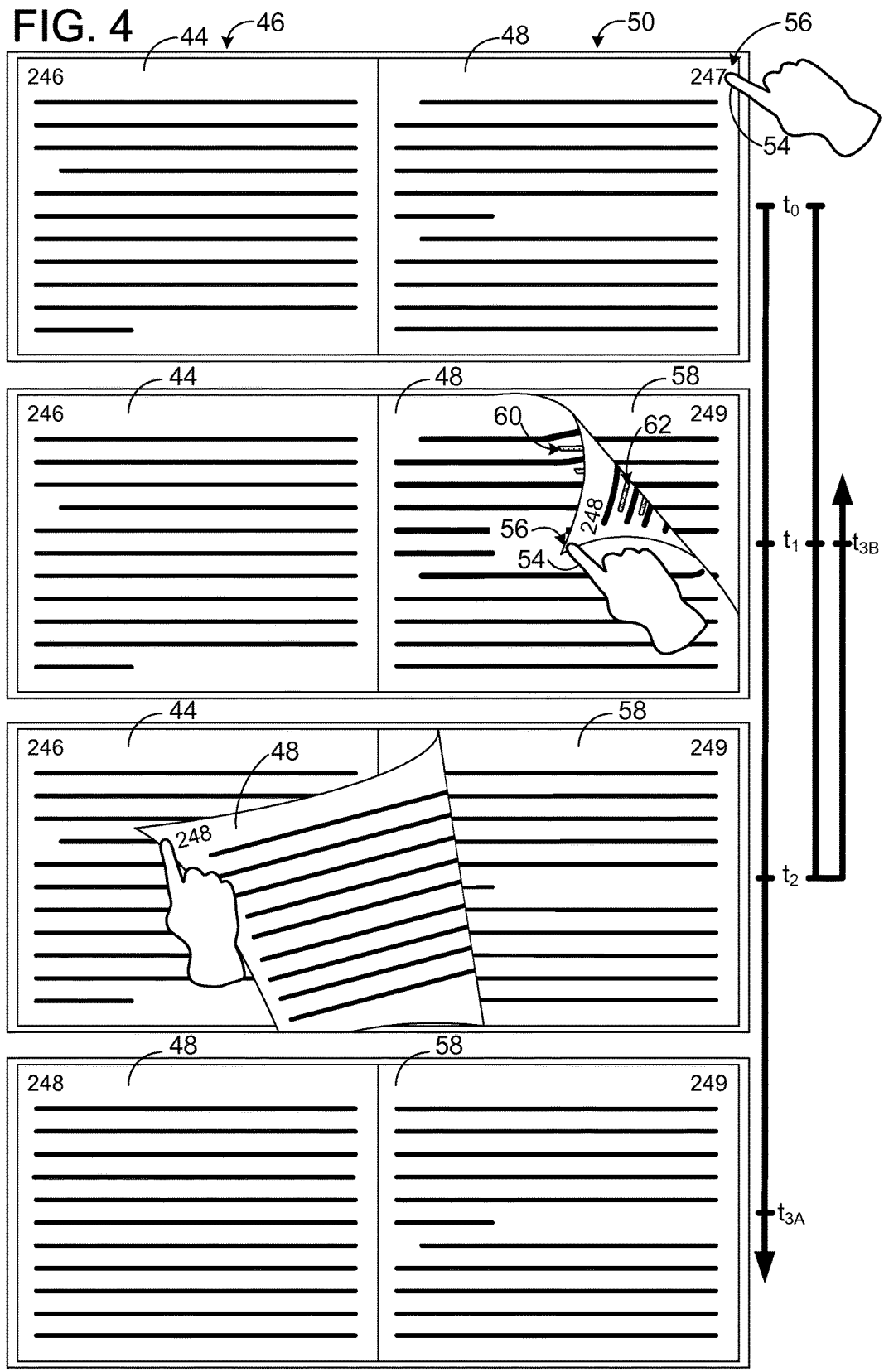
FIG. 4 shows an example virtual page turn in response to an example page-turning gesture.

Turning to FIG. 3, an example method 40 of operating a computing device having a touch display is shown. At 42, method 40 includes displaying one or more pages on the touch display. Depending on the configuration of the touch display, the one or more pages may be displayed in a variety of different ways. A single page may be displayed in a portrait or a landscape view. When two or more pages are displayed, such pages may be arranged horizontally, vertically, or in a two dimensional matrix. Virtually any formatting may be used without departing from the scope of this disclosure. As a nonlimiting example, at time $t_0$ FIG. 4 shows a touch display displaying a back side (page 246) of a first page 44 on a first touch display region 46 and a front side (page 247) of a second page 48 on a second touch display region 50.

Turning back to FIG. 3, at 52, method 40 includes recognizing a gesture in the form of a touch input executed using the touch display on which the one or more pages are displayed. A digital reading device in accordance with the present disclosure may be configured to recognize a plurality of different gestures while displaying one or more pages on a touch display. Description of many such gestures is omitted from the present disclosure in order to more precisely focus on the page-turning methods and processes discussed below.

A gesture may be recognized in a variety of different ways depending on the type of touch display being used. As an example, the touch display may be a capacitive touch screen, in which case recognizing the gesture may include recognizing a change in capacitance of the touch display. As another example, the touch display may be part of a surface computing device that uses infrared light to track user input, in which case recognizing the gesture may include recognizing a change in an amount of infrared light reflecting from a surface of the touch display. Furthermore, once touch input corresponding to a gesture is detected, such touch input may be analyzed to determine what gesture is intended. Parameters that may be used to determine what gesture is intended include, but are not limited to, path of touch input, velocity of touch input, acceleration of touch input, and source of touch input.

At 53, method 40 includes displaying a virtual page turn responsive to recognizing a page-turning gesture. As an example, FIG. 4 shows a scenario in which a finger 54 is directing a page-turning gesture to an outer corner 56 of the front side (page 247) of second page 48 at time $t_0$. In this scenario, a page-turning gesture includes touching an outer corner of the page and dragging the corner across the display, similar to how a corner of a page in a conventional book can be pinched and moved from one side of a book to another. Other page-turning gestures may be recognized without departing from the scope of the present disclosure. Similarly, sources other than fingers may be used to execute a page-turning gesture.

At time $t_1$, FIG. 4 shows a virtual page turn being displayed in response to the page-turning gesture. As shown, the virtual page turn actively follows the page-turning gesture. In other words, the page moves with finger 54, or another source of the gesture. In some embodiments, an actual portion of the page is substantially locked to the gesture source throughout at least a portion of the virtual page turn. For example, outer corner 56 of second page 48 tracks finger 54 as it performs the page-turning gesture. In other embodiments, the page may follow a set path that may deviate from a path of the gesture source, but the velocity of the virtual page turn may correspond to the velocity of the gesture source.

The virtual page turn curls a lifted portion of second page 48, thus providing a visual simulation of a page turning in a conventional book. In the illustrated scenario, a corner section is curled first. In other scenarios, an outer edge of a turning page may remain substantially parallel with the edges of the other pages.

As shown at times $t_1$ and $t_2$, the virtual page turn progressively reveals a back side (page 248) of second page 48. As the page turn begins, a relatively small portion of the back side of the turning page is displayed, as shown at time $t_1$. However, as the virtual page turn advances, the back side of the turning page is progressively revealed, as shown at time $t_2$.

As shown at times $t_1$ and $t_2$, the virtual page turn also progressively reveals a front side (page 249) of a third page 58. As the page turn begins, a relatively small portion of the front side of the subsequent page is displayed, as shown at time $t_1$. However, as the virtual page turn advances, the front side of the subsequent page is progressively revealed, as shown at time $t_2$.

In embodiments in which opposing pages are displayed, the lifted portion of the turning page progressively covers the back side of the opposing page. Such covering of the opposing page may be displayed responsive to an object performing the page-turning gesture moving over a portion of the touch display that was displaying the opposing page. As an example, at time $t_2$, FIG. 4 shows the lifted portion of second page 48 progressively covering the back side (page 246) of first page 44. As shown at time $t_{3,4}$, if the page-turning gesture advances to completion, the virtual page turn substantially fully covers a back side (page 246) of first page 44 with second page 48 and substantially fully reveals a third page 58.

The above described page turning dynamics and visual feedback help leverage a conventional page-turning behavior that many users know and appreciate from experiences with conventional books. To further improve realism and user satisfaction, the lifted portion of the turning page may be displayed with an increased transparency that allows the back side of the turning page to be viewed through the front side of the turning page. For example, at time $t_1$, FIG. 4 schematically shows text 60 from the back side (page 248) of second page 48 viewed through the front side (page 247) of second page 48. As shown, the lifted portion of the turning page may be at least partially transparent, while the portion of the turning page that remains flat on the subsequent page is opaque, or at least less transparent than the lifted portion.

The increased transparency of the lifted portion of a turning page may also allow the front side of the turning page to be viewed through the back side of the turning page. For example, at time $t_1$, FIG. 4 schematically shows text 62 from the front side (page 247) of second page 48 visible through the back side (page 248) of second page 48.

While the above described transparency effects are schematically shown only at time $t_1$ of FIG. 4, it is to be understood that a transparency effect can be implemented on any turning page. The schematic representation of the see-through portions are omitted in the other drawings so as not to distract from other illustrated features.

Figure 5:
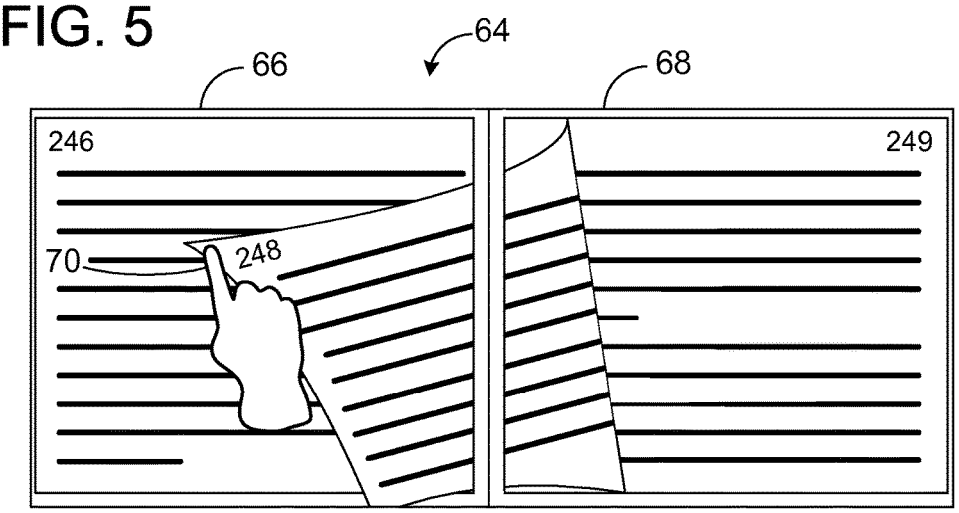
FIG. 5 shows another example virtual page turn in response to an example page-turning gesture.

FIG. 5 shows that a virtual page turn can be displayed on a digital reading device 64 that includes two or more touch displays (e.g., first touch display 66 and second touch display 68) responsive to a source 70 tracking across one display and onto an adjacent display.

Turning back to FIG. 3, at 76 it is indicated that a virtual page return that actively follows the page-turning gesture may be displayed responsive to recognizing a reversal in the page-turning gesture. In other words, if a user begins a page-turning gesture but does not advance the page-turning gesture to completion, the user may reverse the page-turning gesture to return a turning page to its original position. As an example, as discussed above, times $t_0$, $t_1$, and $t_2$, of FIG. 4 show the advancement of a page-turning gesture and resulting virtual page turn. At time $t_{3B}$, however, the user reverses the page-turning gesture and a virtual page return is displayed uncurling a lifted portion of second page 48. During the virtual page return, a back side (page 248) of second page 48 is progressively concealed while a front side (page 249) of third page 58 is progressively concealed. A user may switch back and forth between executing a virtual page turn and a virtual page return, and/or a user may pause a virtual page turn or a virtual page return.

Turning back to FIG. 3, at 78, method 40 includes accelerating the virtual page turn ahead of an object performing the page-turning gesture to quickly complete the virtual page turn. An accelerated virtual page turn may be performed in response to a shortcut in the page-turning gesture. Such a shortcut in the page-turning gesture may be recognized at the onset of a page-turning gesture and/or such a shortcut may be recognized as interrupting a page-turning gesture already in progress. The accelerated page turn provides a user with a mechanism for quickly turning pages one page at a time, without performing a gesture that tracks across a large portion of the touch display. A variety of different shortcut gestures may be used without departing from the scope of this disclosure. Nonlimiting examples of shortcut gestures include tapping or double tapping a corner of a page to be turned, flicking a corner of a page to be turned, or using two or three fingers to touch a corner of a page to be turned.

Figure 6:
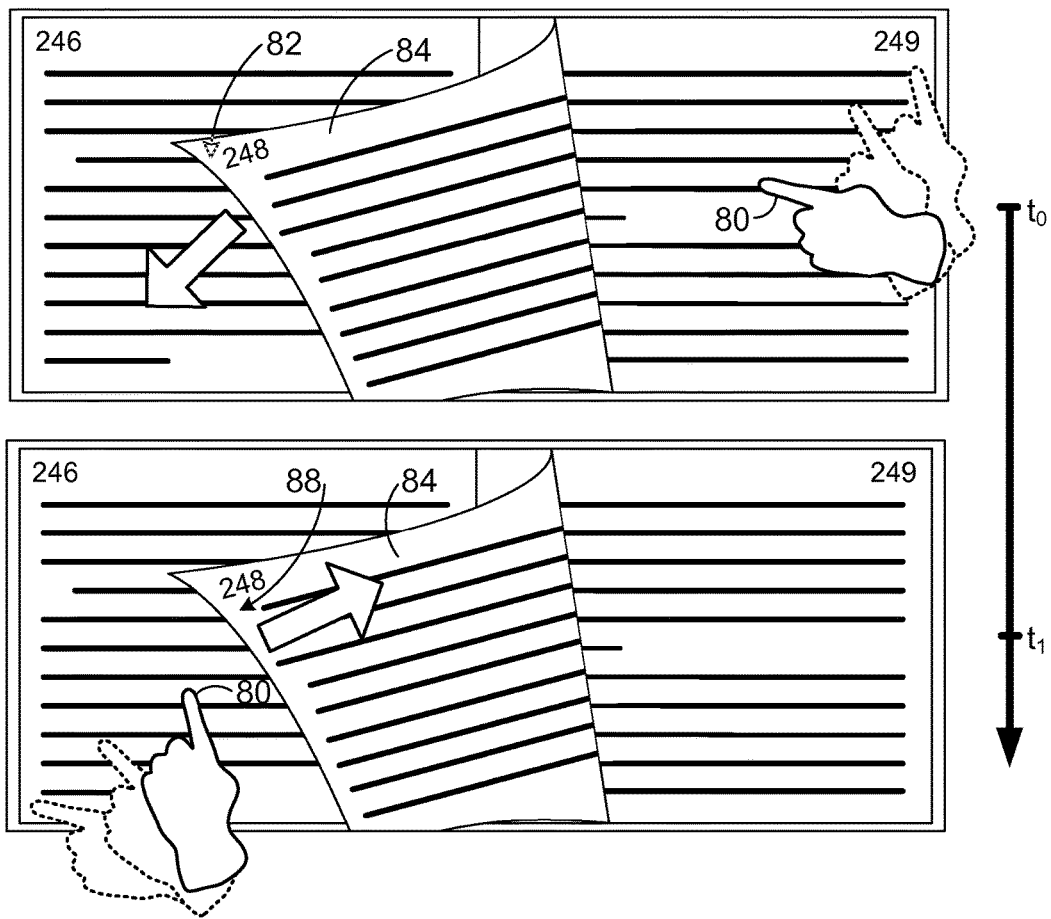
FIG. 6 shows an example accelerated virtual page turn in response to an example shortcut to a page-turning gesture.

As an example, FIG. 6 shows a source in the form of a finger 80 that has flicked an outer corner 82 of a front side (page 247) of a turning page 84 at time $t_0$. In this scenario, a flicking gesture is a shortcut that accelerates the virtual page turn ahead of the flicking finger. In other words, page 84 advances towards completion of the virtual page turn although finger 80 only moves a short distance, albeit at a high speed.

As indicated at 86 of FIG. 3, an accelerated virtual page return may be executed in response to recognizing a shortcut in a page return gesture. Continuing with the scenario of FIG. 6, at time $t_1$ finger 80 has flicked an outer corner 88 of a back side (page 248) of a turning page 84. The flicking shortcut gesture allows the user to quickly turn a page backwards.

Turning back to FIG. 3, at 90, method 40 includes displaying the quick flipping of several pages responsive to the same page-flipping gesture. Such page flipping may facilitate quickly scrubbing through many pages, thus allowing a user to find a particular page of interest. A page-flipping gesture may be independent of other page-turning gestures and/or a page-flipping gesture may interrupt another page-turning gesture already in progress. A variety of different page-flipping gestures may be used without departing from the scope of this disclosure. Nonlimiting examples of page-flipping gestures include scrolling along an outer edge of a touch display with one or more fingers or using two or more fingers to track across an interior portion of the touch display. In some embodiments the speed of page flipping can be correlated to the speed of the page-flipping gesture. Furthermore, the relationship between the speed of the gesture and the resulting speed of the page flipping can be linear, exponential, or any other suitable relationship.

Figure 7:
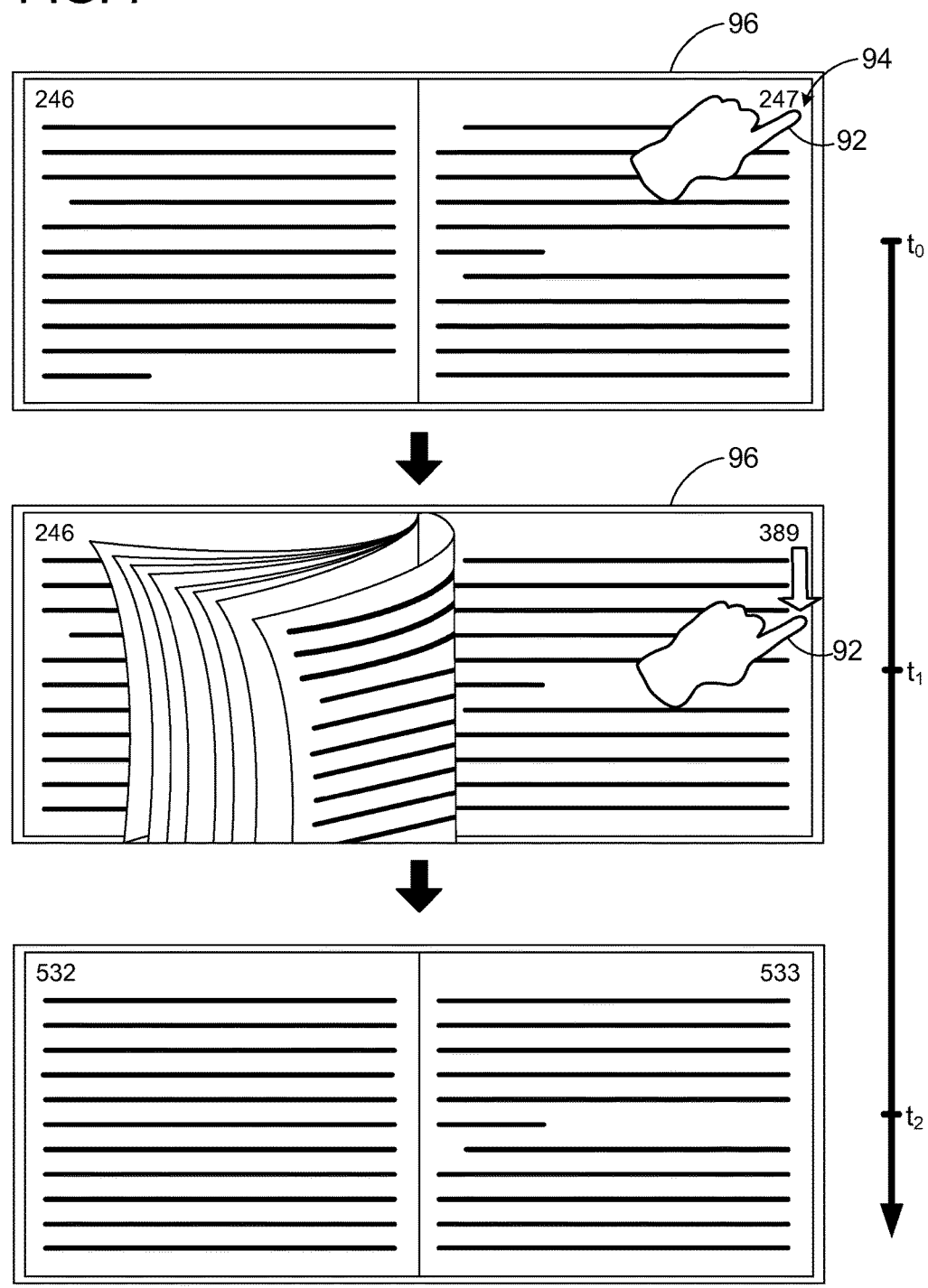
FIG. 7 shows an example virtual page flip in response to an example page-flipping gesture.

As an example, at time $t_0$, FIG. 7 shows a source in the form of a finger 92 initiating a page-flipping gesture on an outer corner 94 of a touch display 96. At time $t_1$, finger 92 scrolls down along the outer edge of touch display 96. Responsive to such scrolling, pages quickly flip, thus simulating the scrubbing of a conventional book. As shown at time $t_2$, if the page-flipping gesture advances to completion, a relatively large number of pages can be turned in a relatively short amount of time. In the illustrated example, the user quickly flips from page 247 to page 533. As mentioned above, the speed of flipping can be scaled to the speed of the page-flipping gesture (in a linear or nonlinear manner), thus facilitating a user's ability to land on an intended page. In other words, a user may slow the page-flipping gesture when approaching an intended page, and then slowly creep up on the intended page using a relatively slow-moving page-flipping gesture. Furthermore, as indicated at 98 of FIG. 3, a user may reverse the page-flipping gesture, thus allowing the user to flip back-through the pages.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A system of animating a virtual page turn, the system comprising:
   at least one processor; and
   memory encoding computer executable instructions that, when executed by the at least one processor, perform a method comprising:
   recognizing a page-turning gesture;
   responsive to the page-turning gesture, displaying a virtual page turn that lifts a portion of a first page having a first front side and a first back side, wherein the virtual page turn comprises progressively revealing a second front side of a second page, the first backside of the first page having a transparency level that allows the first front side to be viewed through the back side of the first page;
   recognizing a page-flipping touch gesture received by the touch display, wherein the touch gesture is received entirely within a gesture area of the touch display, the gesture area located within a perimeter of the page; and
   responsive to the page-flipping touch gesture, displaying an animation that turns the page and one or more successive pages to a landing page.

2. The system of claim 1, wherein the landing page to which the animation turns is based on an ending position of the page-flipping touch gesture within the gesture area.

3. The system of claim 2, wherein the landing page to which the animation turns is further based on a beginning position of the page-flipping touch gesture within the gesture area.

4. The system of claim 3, wherein the landing page to which the animation turns is further based on a speed of the page-flipping touch gesture within the gesture area.

5. The system of claim 1, wherein the landing page to which the animation turns is based on a beginning position of the page-flipping touch gesture within the gesture area.

6. The system of claim 1, wherein the gesture area is on an outer edge of the page.

7. The system of claim 6, wherein the outer edge is a top edge, right edge, bottom edge, or left edge of the page.

8. The system of claim 6, wherein the page-flipping touch gesture includes scrolling along the outer edge.

9. The system of claim 1, wherein the method further comprises, responsive to a reversal in the page-flipping touch gesture, displaying a virtual page return that reverses a direction of page flipping.

10. The system of claim 1, wherein the gesture area is successively located within a perimeter of different ones of the one or more successive pages as the animation progresses.

11. A method of animating a virtual page turn, comprising:
    displaying a page on a display, wherein displaying the page on the display comprises:
    determining a configuration of the display;
    when the display is in a portrait configuration, displaying a single page from a virtual book; and
    when the display in in a landscape configuration, at least two pages from the virtual book;
    recognizing a page-turning gesture;
    responsive to the page-turning gesture, displaying a virtual page turn that lifts a portion of a first page having a first front side and a first back side, wherein the virtual page turn comprises progressively revealing a second front side of a second page, the first backside of the first page having a transparency level that allows the first front side to be viewed through the back side of the first page;
    recognizing a page-flipping gesture; and
    responsive to the page-flipping gesture, turning a plurality of pages at an increased rate.

12. The method of claim 11, wherein a landing page to which the plurality of virtual pages successively turn is based on an ending position of the page-flipping gesture within a gesture area of the display located entirely within a perimeter of the page at a beginning of the page-flipping gesture.

13. The method of claim 12, wherein the landing page to which the plurality of virtual pages successively turn is further based on a beginning position of the page-flipping gesture within the gesture area.

14. The method of claim 12, wherein the gesture area is on a top edge, right edge, bottom edge, or left edge of the page.

15. The method of claim 11, wherein turning a plurality of virtual pages at an increase rate further comprises displaying the plurality of virtual pages successively turning.

16. A memory device encoding computer executable instructions that, when executed by at least one processor, perform a method comprising:
    displaying a page on a display, wherein displaying the page on the display comprises:
    determining a configuration of the display;
    when the display is in a portrait configuration, displaying a single page from a virtual book; and
    when the display in in a landscape configuration, at least two pages from the virtual book;
    recognizing a page-turning gesture;
    responsive to the page-turning gesture, displaying a virtual page turn that lifts a portion of a first page having a first front side and a first back side, wherein the virtual page turn comprises progressively revealing a second front side of a second page, the first backside of the first page having a transparency level that allows the first front side to be viewed through the back side of the first page;
    recognizing a page-flipping gesture; and
    responsive to the page-flipping gesture, turning a plurality of pages at an increased rate.

17. The memory device of claim 16, wherein a landing page to which the plurality of virtual pages successively turn is based on an ending position of the page-flipping gesture within a gesture area of the display located entirely within a perimeter of the page at a beginning of the page-flipping gesture.

18. The memory device of claim 17, wherein the landing page to which the plurality of virtual pages successively turn is further based on a beginning position of the page-flipping gesture within the gesture area.

19. The memory device of claim 16, wherein the gesture area is on a top edge, right edge, bottom edge, or left edge of the page.

20. The memory device of claim 16, wherein turning a plurality of virtual pages at an increase rate further comprises displaying the plurality of virtual pages successively turning.

* * * * *